United States Patent
Barron

(10) Patent No.: US 6,665,709 B1
(45) Date of Patent: Dec. 16, 2003

(54) METHOD, APPARATUS, AND SYSTEM FOR SECURE DATA TRANSPORT

(75) Inventor: Robert H. Barron, Singer Island, FL (US)

(73) Assignee: Securit-E-Doc, Inc., West Palm Beach, FL (US)

( * ) Notice: Subject to any disclaimer, the term of this patent is extended or adjusted under 35 U.S.C. 154(b) by 0 days.

(21) Appl. No.: 09/536,203

(22) Filed: Mar. 27, 2000

(51) Int. Cl.[7] .............................................. G06F 15/16
(52) U.S. Cl. ...................... 709/217; 709/201; 709/203; 709/226; 707/5; 707/10
(58) Field of Search ................................ 709/203, 230, 709/249, 226, 217, 218, 201; 370/231; 707/3, 5, 10, 203, 226

(56) References Cited

U.S. PATENT DOCUMENTS

| | | | |
|---|---|---|---|
| 5,841,870 A | * 11/1998 | Fieres et al. ................ 713/156 |
| 6,035,406 A | 3/2000 | Moussa et al. | |
| 6,105,042 A | * 8/2000 | Aganovic et al. ............ 715/500 |
| 6,198,824 B1 | * 3/2001 | Shambroom ................ 380/279 |
| 6,226,744 B1 | * 5/2001 | Murphy et al. ............. 713/200 |
| 6,314,521 B1 | * 11/2001 | Debry ........................ 713/201 |
| 6,421,673 B1 | * 7/2002 | Caldwell et al. ............. 707/10 |
| 6,424,718 B1 | * 7/2002 | Holloway ................... 380/277 |
| 6,584,466 B1 | * 6/2003 | Serbinis et al. .............. 707/10 |

FOREIGN PATENT DOCUMENTS

| | | |
|---|---|---|
| EP | 0 907 120 A2 | 4/1999 |
| GB | 2 318 486 | 4/1998 |

* cited by examiner

*Primary Examiner*—David Wiley
*Assistant Examiner*—Phuoc Nguyen
(74) *Attorney, Agent, or Firm*—McHale & Slavin, P.A.

(57) ABSTRACT

A platform allowing for the secure file transfer from one location to another (internet or intranet) with virtually impregnable encryption, secure data storage, and a simple web-based user interface. A user accesses the system by a data-base authentication system requiring user name and password. The program residing on the server then generates an encryption sequence. A temporary file is created on the users's machine upon which the user uploads the information to be sent. The information is automatically encrypted by the program and transferred to the server and the user's temporary file deleted. The information is securely stored in the program on the server until the recipient downloads it. The recipient also accesses the server by a user name and password. The program generates a decryption program. The recipients machine receives the applet program to decrypt the file and a copy of the encrypted file. After decryption is complete, the program saves the files to a specified recipient folder, and can be automatically deleted or archived.

10 Claims, 4 Drawing Sheets

METHOD, APPARATUS, AND SYSTEM FOR SECURE DATA TRANSPORT

FIELD OF THE INVENTION

This invention relates generally to the field of data transmission over computer networks and more particularly to a universally adaptable server-side software system for an automatically encrypted and decrypted, password controlled secure transfer of data from a source host to a destination host across any internetwork.

BACKGROUND OF THE INVENTION

In recent years, the widespread adoption of public and private networks has modernized the manner is which organizations communicate and conduct business. Advanced networks provide an attractive medium for communication and commerce because of their global reach, accessability, use of open standards, and ability to permit interactions on a concurrent basis. Additionally, networks allow businesses a user-friendly, low cost way to conduct a wide variety of commercial functions electronically.

A computer network is basically a collection of computers that are physically and logically connected together to exchange data or "information." The network may be local area network, connected by short segments of ethernet or to the same network hub, or wide area network, separated by a considerable distance. An internetwork is a network of computer networks, of which the Internet is commonly acknowledged as the largest.

The Internet is based on standard protocols that allow computers to communicate with each other even if using different software vendors, thus allowing anyone with a computer easy accessability to everything else connected to the Internet world wide. As a result of this global access, it is becoming increasingly useful for businesses and individuals to transmit information via networks and internetworks from one site to another.

The interconnected computers exchange information using various services, for example, the World Wide Web (WWW)and electronic mail. The WWW created a way for computers in various locations to display text that contained links to other files. The WWW service allows a server computer system (Web server or Web site) to send graphical Web pages of information to a remote client computer system. The remote client computer system can then display the Web pages.

In a standard e-mail system, a user's computer is connected to a provider of Internet services, and the user's computer provides an e-mail password when polling the provider's computer for new mail. The mail resides on the provider's computer in plain text form where it can be read by anyone. In both examples, the information, if unsecured, is replicated at many sites in the process of being transmitted to a destination site and thereby is made available to the public.

Organizations are increasingly utilizing these networks, to improve customer service and streamline business communication through applications such as e-mail, messaging, remote access, intranet based applications, on-line support and supply chain applications. The very openness and accessibility that has stimulated the use of public and private networks has also driven the need for network security.

Presently, to provide for a secure transfer of information, it may be encrypted at the sending host's end and decrypted at the receiver's end. Encryption algorithms transform written words and other kinds of messages so that they are unintelligible to unauthorized recipients. An authorized recipient can then transform the words or messages back into a message that is perfectly understandable. Currently, there are two basic kinds of encryption algorithms (1) symmetric key algorithms and (2) public key algorithms.

Symmetric (or private) key algorithms use the same key to encrypt and decrypt the message. Generally, they are faster and easier to implement than public keys. However, for two parties to securely exchange information, those parties must first securely exchange an encryption key. Examples of symmetric key algorithms include DES, DESX, Triple-DES, Blowfish, IDEA, RC2, RC4, and RC5.

Public key algorithms use one key (public key) to encrypt the message and another key (private key) to encrypt it. The public key is made public and is used by the sender to encrypt a message sent to the owner of the public key then the message can only be decrypted by the person with the private key. Unfortunately, public keys are very slow, require authentication, and do not work well with large files.

A third type of system is a hybrid of the public and private systems. The slower public key cryptography is used to exchange a random session key, which is then used as the basis of a symmetric (private) key algorithm. The session key is used only for a single encryption session and is then discarded. Nearly all practical public key cryptography implementations in use today are actually hybrid systems.

Finally, message digest functions are used in conjunction with public key cryptography. A message digest function generates a unique pattern of bits for a given input. The digest distills the information contained in a file into a single large number, typically 128 and 256 bits in length. The digest value is computed in such a way that finding an input that will exactly generate a given digest is computationally infeasible.

Message digest algorithms are not used for encryption or decryption but for creation of digital signatures, messages authentication codes (MAC), and the creation of encryption keys from passphrases. For example, Pretty Good Privacy (PGP) uses message digests to transform a passphrase provided by a user in to an encryption key that is used for symmetric encryption. (PGP uses symmetric encryption for its "conventional encryption" function as well as to encrypt the user's private key). A few digest in use are HMAC, MD2, MD4, MD5, SHA, and SHA-1.

Working cryptographic systems can be divided into two categories; (1) programs and protocols that are used for encryption of e-mail messages such as PGP and S/MIME and (2) cryptographic systems used for providing confidentiality, authentication, integrity, and nonrepudiation in a network environment. The latter requires real-time interplay between a client and a server to work properly. Examples include Secure Socket Layer (SSL) a general-purpose cryptographic protocol that can be used with any TCP/IP service and PCT a transport layer security protocol for use with TCP/IP service, PCT, S-HTTP, SET, Cybercash, DNSSEC, Ipsec, IPv6, Kerberos, and SSH.

Although the present means of securing the electric transfer of information provides a level of security, the security provided can be easily breached. Symmetric encryption algorithms are vulnerable to attack by (1) key search or brute force attacks, (2) cryptanalysis, and (3) systems-based attacks. First, in a key search, the cracker simply tries every possible key, one after and other, until the he/she is allowed into the system or the ciphertext is decrypted. There is no way to defend against this but a 128 bit key is highly resistant because of the large number of possible keys to be tried.

Second, in cryptanalysis, the algorithm can be defeated by using a combination of sophisticated mathematics and computer power. Many encrypted messages can be deciphered without knowing the key. Finally, the cryptographic system itself is attacked without actually attacking the algorithm.

Public key algorithms are theoretically easier to attack then symmetric key algorithms because the attacker has a copy of the public key that was used to encrypt the message. Also, the message presumable identifies which public key encryption algorithm was used to encrypt the message. These attacks are (1) factoring attacks and (2) algorithmic attacks. First, factoring attacks attempt to derive a private key from its corresponding public key. This attack can be performed by factoring a number that is associated with the public key.

Second, an algorithm attack consists of finding a fundamental flaw or weakness in the mathematical problem on which the encryption system is based. Although not often done, it has been accomplished.

Message digest functions can be attacked by (1) finding two messages—any two messages—that have the same message digest and (2) given a particular message, find a second message that has the same message digest code.

Thus, what is needed is a system for securing the electronic transfer of information that circumvents decryption. Also, needed is one system that can be used for both e-mail and internet security. Finally, needed is a widely available, user-friendly system for securing electronic transfer and storage of information.

SUMMARY OF THE INVENTION

The present invention provides a universally adaptable server-side software system designed to administrate access and facilitate virtually impregnable security for the delivery, storage, and sharing of documents and files utilizing any compatible network as a secure communications forum.

In general, the instant invention is a method and apparatus for encrypting data with a either a random automatic mode of encryption, and a client selected private key, that does not travel with the document. The method and apparatus, writes the encryption algorithm creating a packaged application. The encryption program generates random sequences or encryption algorithms, with respect to time sensitivity, to be used in the packaged application that it creates. No two algorithms will ever be the same.

In the basic embodiment, the client accesses the server using a data-base authentication system requiring User name and Password. Once access is granted, the packaged application is sent to the client machine as a temporary file to encrypt the files being sent or uploaded to the server. The application package breaks the files down into binary form, reads the binary form, and then rewrites the data to the temporary file it created. On a binary level, the code is rewritten and saved for transfer in a file format only decodable by the end recipient. Once this process is complete, the application packet then sends the encrypted data to the server via SSL protocol connection.

The data resides on the server waiting for an intended recipient to download and unlock it. When file retrieval is requested, the server authenticates the user and password via a log-on system. Once access is granted, the server generates a new application packet designed to decrypt the file being requested, based on the original encryption algorithm. The server retrieves its original entry, sets into motion the sequence of creating a decryption program, saves the generated program, and then sends the application packet to the requesting client machine.

The client machine receives the application packet to decrypt the file from the server and a copy of the file to be decrypted is downloaded. The application program now runs the calculations it needs to decrypt the data with the sequence it was given. The application program opens the file, reads the binary data, and writes the data to a new temporary file created for its reception. When the file is decrypted, the program saves the file to a folder specified by the recipient and then deletes itself providing a secure transfer. Upon completion the transfer, the original encrypted file located on the server can be deleted or retained archival.

Accordingly, it is an objective of the instant invention to provide a method and apparatus that provides secure electronic transfer of information by using a random and automatic mode of encryption wherein no two algorithms are ever repeated.

Still another objective of the instant invention to provide a method and apparatus that allows for secure data transportation that encrypts at the 128 bit level, transports and stores data encrypted, and decrypted only to an authorized user.

A further objective of the instant invention to provide a basic level of security wherein data is transported via an SSL protocol and automatically encrypted. In this mode only authorized user on a network can decrypt data for review or modification. Separately and in addition, a secure e-mail notification is dispatched to the intended recipient(s) to inform them of secure data waiting for retrieval.

Another objective of the instant invention to provide a heightened level of security wherein a private and secondary key or digital file lock can be employed providing a unique secondary data lock.

Still another objective of the instant invention to provide a client-side locking device or biometric interface. In such a locking device, a retinal scanner, finger print scanner, smart card reader or the like anc be implemented in order to send or retrieve information.

Yet another objective of the instant invention is to provide virtually impregnable security for the delivery, storage, and sharing of documents and files utilizing any compatible network as a secure communications forum.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE INVENTION

Although the invention will be described in terms of a specific embodiment, it will be readily apparent to those skilled in this art that various modifications, rearrangements, and substitutions can be made without departing from the spirit of the invention. The scope of the invention is defined by the claims appended hereto.

Figure 1:
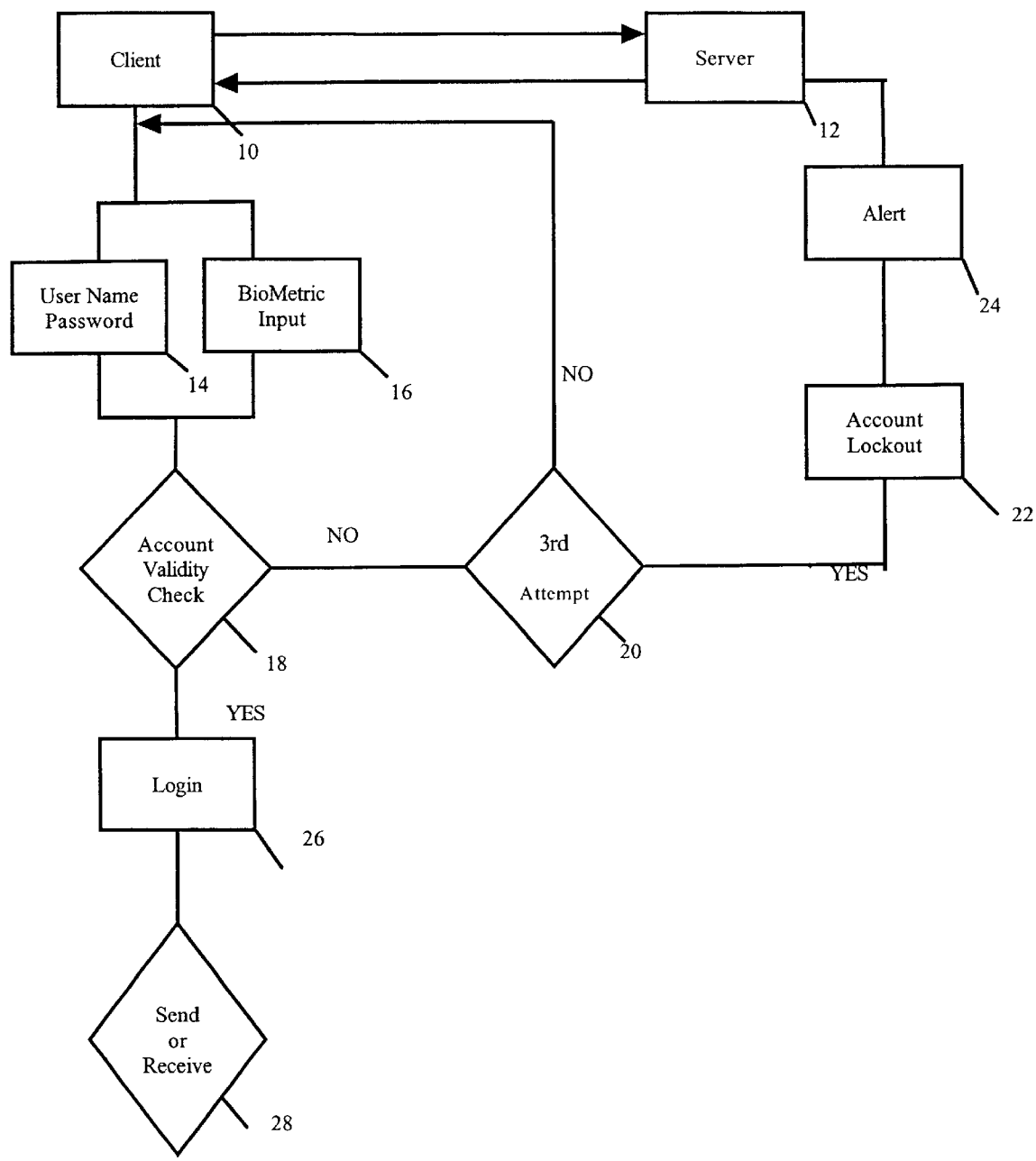
FIG. 1 is a block diagram of the client file encryption transfer request of the instant invention.

Now, referring to FIG. 1, shown is flow chart depicting the steps required for encrypting data allowing for secure transfer of electronic data. A client 10 opens a web browser and accesses a qualified server 12 therein requesting data transfer. The server 12 provides login account qualifier data requiring either user name and a password 14 or a biometric interface 16 such as a retinal scanner, finger print scanner, smart card reader and the like for the purpose of seeking data-base authentication 18. If login fails, the user has three attempts 20 before the account is locked 22 and the administrator and the account holder 24 is alerted. Upon a successful login 26, a transfer request 28 is sent to the control program on the server to open a transfer information page inquiry page.

Figure 2:
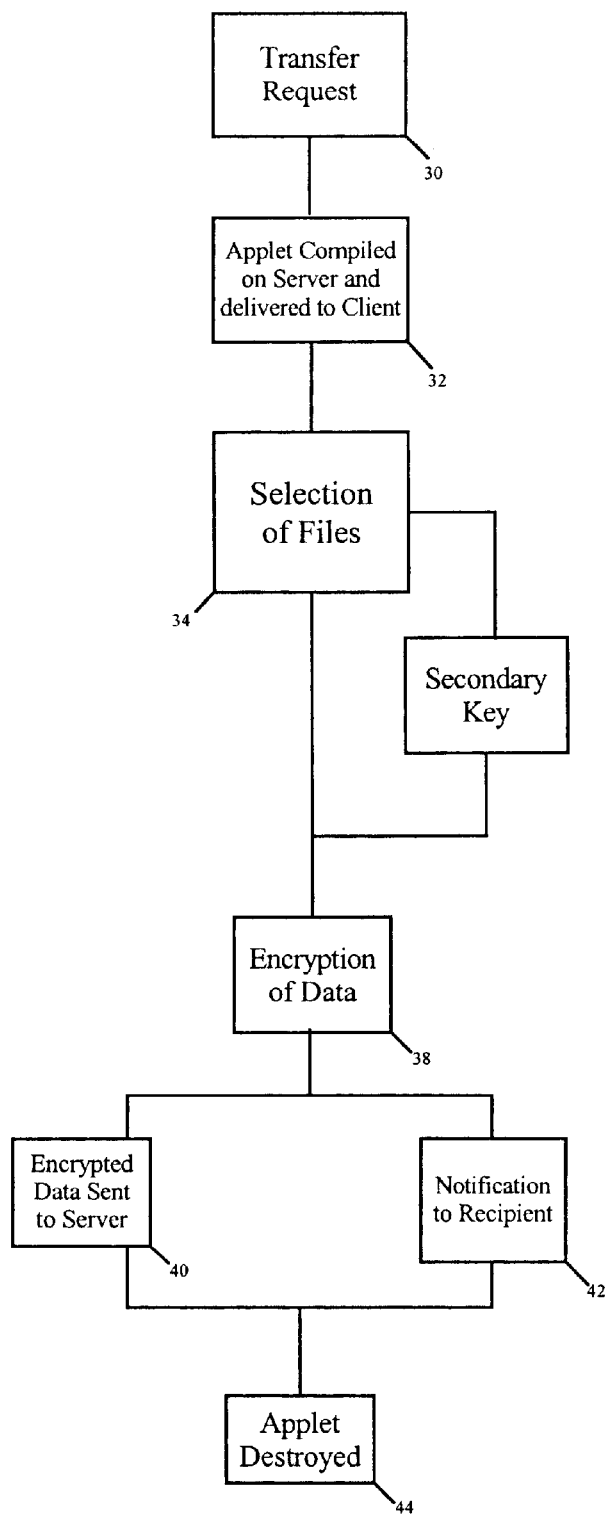
FIG. 2 is a block diagram of the encryption transfer.

Referring now to FIG. 2, when data is to be transferred 30, an applet is compiled on the server and sent to the client 32. The applet is a temporary file allowing the client to select 34 the data files that are to be transferred. The user adds the file(s) to be transferred to the application window 46. If the user account allows, the client has the option of entering via the keyboard, a secondary security key 36. It should be noted that even if two separate people encrypted the exact same file with the same key, they will have encrypted two uniquely different sequences. If one attempts to "crack" the application sequence, they would not be able to decrypt it because each applet is embedded with a unique encryption sequence. The encryption sequence generated is added to the applet template and compiled 38 and transferred to the server 40 with notification sent to the recipient 42.

The applet breaks the code of the files down into its binary form during execution It reads the binary data and then rewrites the data to the temporary file that was previously created. The running program changes the entire code sequence of the client file to a randomly generated sequence specified by the particular and customized applet. The sequence is also designed to replace every other matching bit of binary code with a unique string. Thus, with this method, an "a", for example, will never be represented twice in the same file structure. This is designed to deter the common method of cracking encrypted code by repeated or pattern data.

On a binary level, the code is rewritten and saved for transfer in a file format only decodable by the recipient. The applet then sends the encrypted data to the server via SSL protocol. Once the transfer is complete, the applet deletes any trace of the file encrypted. With the destruction of the applet, no two applications are ever the same because each application contains it's own encryption sequence that cannot be replicated.

The encrypted data resides on the server 12 waiting for an intended recipient to download and unlock it. This creates the ability to maintain completely encrypted and secure data archives. When file retrieval is requested by a recipient, the server then accesses the original record information of the sequence or algorithm that it originally gave to the applet that the server created to encrypt the file.

Figure 3:
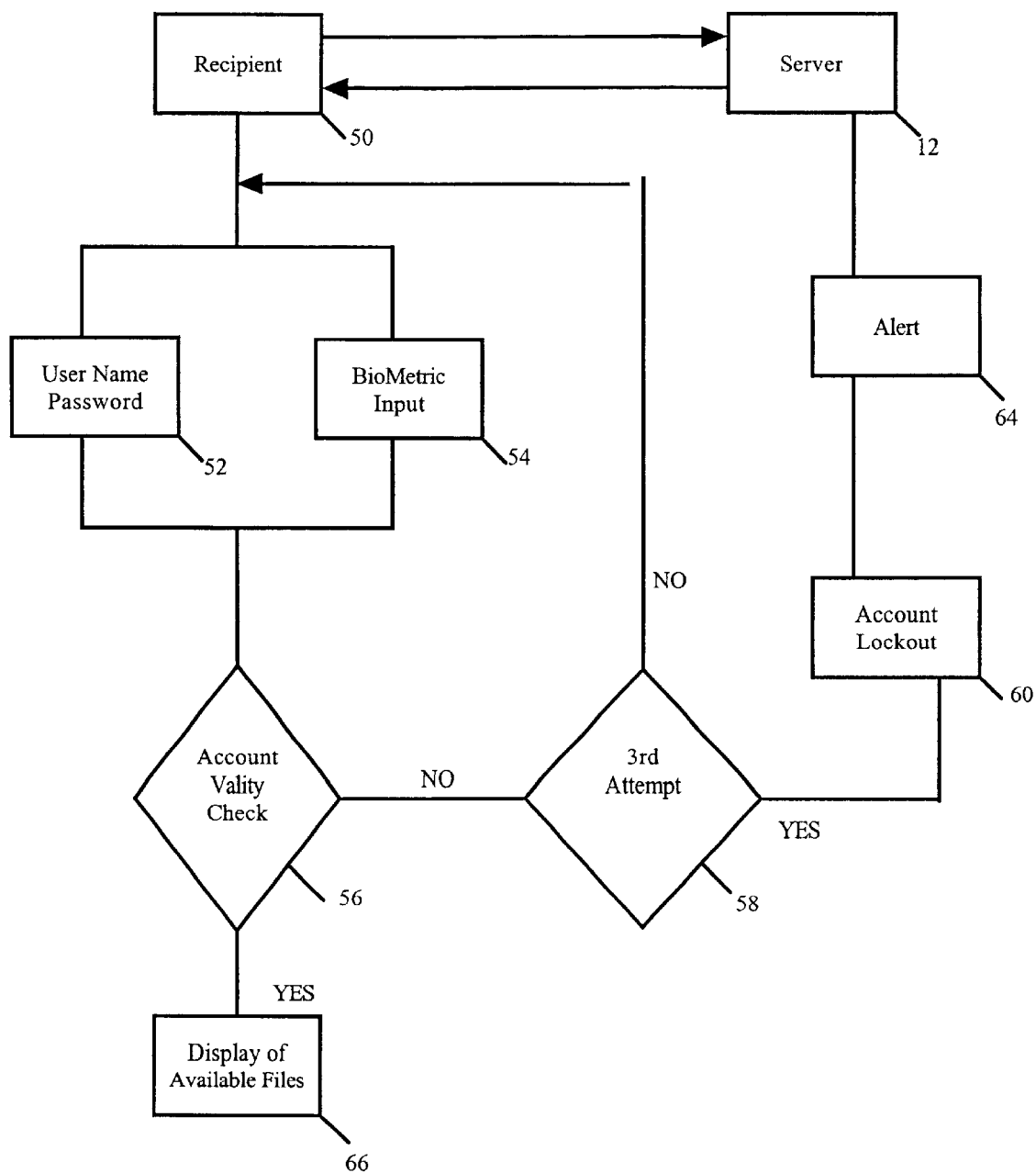
FIG. 3 is a block diagram of the recipient file request.
Figure 4:
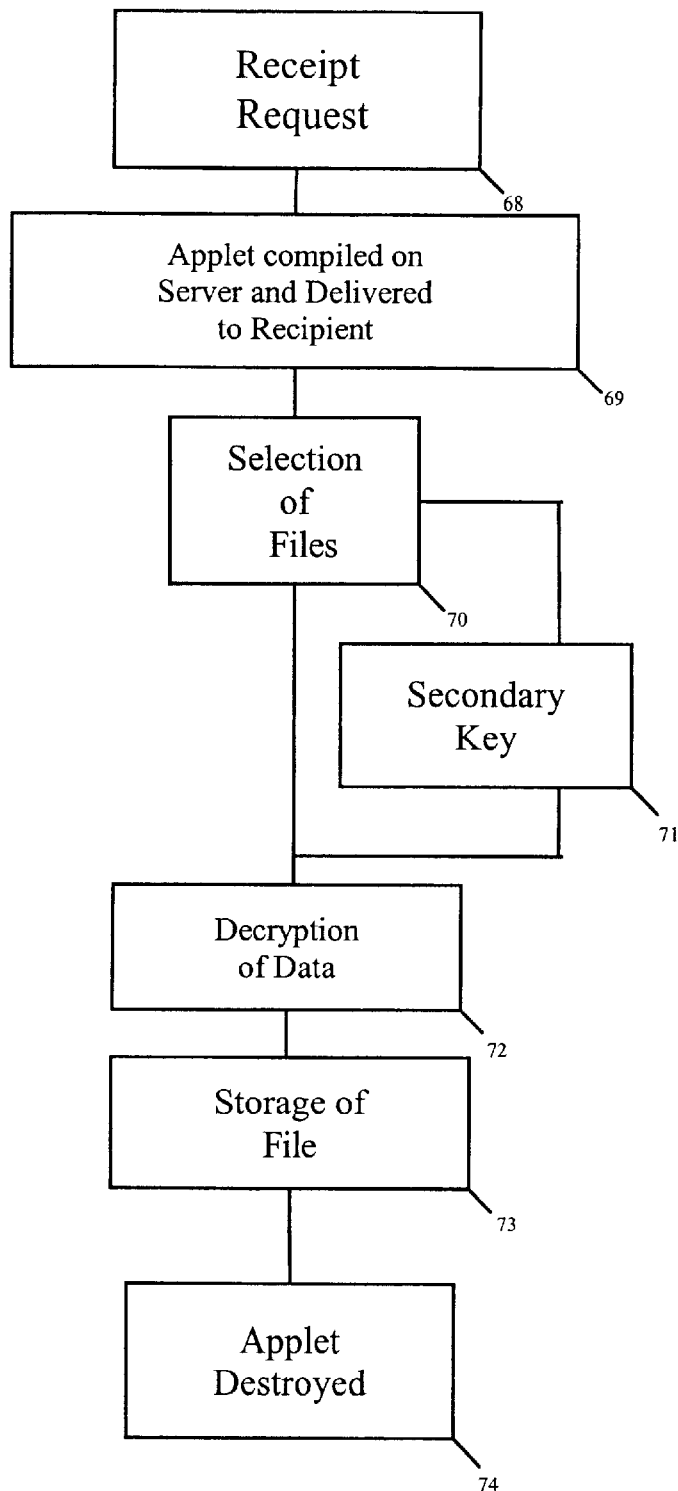
FIG. 4 is a block diagram of the decryption transfer.

Now referring to FIG. 3, shown is the flow chart depicting the steps for decrypting data for a secure receipt of electronic data. A recipient 50 opens a web browser and accesses a qualified server 12 therein requesting data transfer. The server 12 provides login account qualifier data requiring either user name and a password 52 or a biometric interface 54 such as a retinal scanner, finger print scanner, smart card reader and the like for the purpose of seeking data-base authentication 56. If login fails, the user has three attempts 58 before the account is locked 60 and the administrator and the account holder 62 is alerted.

If the login is successful, the server 12 depicts those files available to the recipient 66. The recipient chooses which file to retrieve and the server generates a new applet designed to decrypt the file requested 69, based on the original encryption sequence. The file is retrieved 70 and stored in a temporary file. The program now prompts the user for any secondary key 71 that was originally entered by the sender. Once the key sets the sequence, the applet calculates the sequence that was originally written on the fly. The applet resumes decryption with the new sequence of the temporary file wherein decryption is executed 72 and the decrypted file saved to a selection location. When the data decryption is complete, the program saves the file 73 with original extensions, to a folder specified by the recipient. Then the applet deletes itself 74 and any data related to the secure transfer. Upon completion of the transfer and decryption process, the original encrypted file located on the server can be triggered to be automatically deleted or retained for manual deletion.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

What is claimed is:

1. A method of encrypting data for secure transfer and storage of electronic data comprising the steps of:
   accessing a conventional web browser from a client computer;
   logging onto a qualified server and providing account qualifier data;
   reading a transfer information inquiry page upon verification of account qualifier;
   obtaining a first applet compiled on said server in response to the inquiry page, the first applet operable to perform the steps of
   allowing a client to select a data file to be transferred to the qualified server,
   generating a unique random encryption sequence,
   encrypting the selected data file to form an encrypted data packet;
   forwarding the data packet to said qualified server for storage;
   storing the randomly generated encryption sequence on the qualified server; and
   deleting the first applet from the client computer; and
   providing a means for decrypting said encrypted data packet comprising the steps of:
   accessing a conventional web browser;
   logging onto a qualified server and providing account qualifier data;
   reading a transfer information inquiry page verification of account qualifier; and
   obtaining a second applet compiled on the server in response to said inquiry page, the second applet operable to perform the steps of displaying files available to a recipient;
   allowing the recipient to select a file to be retrieved from the qualified server;

retrieving the encrypted data packet and original encryption sequence associated with the selected file;

calculating the decryption sequence based on the original encryption sequence;

decrypting the encrypted data packet;

transferring the file to the client computer; and deleting the second applet from the client computer.

2. The method of claim 1, wherein the software application residing on the Web server is platform-independent.

3. The method of claim 1, further including the step of compressing the encrypted data packet prior to transferring the encrypted data packet to the archive server.

4. The method of claim 3, wherein the encryption applet includes a compression program to compress the electronic data to form a compressed encrypted data packet.

5. The method of claim 1, wherein the encryption applet compiled by the software application is based on an encryption algorithm, and the encryption algorithm is changeable with respect to the software application.

6. The method of claim 1, further comprising the steps of:

providing a plurality of encryption algorithms;

selecting an encryption algorithm; and compiling the encryption applet using the selected encryption algorithm.

7. The method according to claim 1 wherein the first applet is further operable to perform the step of providing a secondary security key.

8. The method according to claim 7, wherein said secondary security key is a digital file lock.

9. The method according to claim 1 wherein a recipient is notified of an encrypted data file residing on the qualified server by an e-mail message sent via the open SSL protocol upon submittal of said data packet to said server.

10. The method according to claim 1 wherein said account qualifier is compared against a stored database.

* * * * *

UNITED STATES PATENT AND TRADEMARK OFFICE
CERTIFICATE OF CORRECTION

PATENT NO. : 6,665,709 B1  Page 1 of 1
DATED : December 16, 2003
INVENTOR(S) : Barron It is certified that error appears in the above-identified patent and that said Letters Patent is hereby corrected as shown below:

Column 2,
Line 16, the word "encrypt" should be replace with -- decrypt --.

Signed and Sealed this

Twenty-second Day of June, 2004

JON W. DUDAS
*Acting Director of the United States Patent and Trademark Office*